United States Patent
Mayr

(10) Patent No.: US 8,549,855 B2
(45) Date of Patent: Oct. 8, 2013

(54) METHOD AND DEVICE FOR SUPPLYING A COMPRESSOR IN AN INTERNAL COMBUSTION ENGINE WITH COMPRESSED AIR

(75) Inventor: Mathias Mayr, Germering (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 233 days.

(21) Appl. No.: 12/854,474

(22) Filed: Aug. 11, 2010

(65) Prior Publication Data

US 2011/0014067 A1 Jan. 20, 2011

Related U.S. Application Data

(63) Continuation of application No. PCT/EP2009/000939, filed on Feb. 11, 2009.

(30) Foreign Application Priority Data

Feb. 12, 2008 (DE) .......................... 10 2008 008 721

(51) Int. Cl.
*F02B 33/44* (2006.01)
*F02M 25/07* (2006.01)

(52) U.S. Cl.
USPC ........ 60/611; 60/605.2; 701/108; 123/568.12

(58) Field of Classification Search
USPC ......... 60/602, 605.2, 611, 280; 417/364, 349; 701/108; 123/568.12
See application file for complete search history.

(56) References Cited

U.S. PATENT DOCUMENTS

| 5,669,365 | A | * | 9/1997 | Gartner et al. | ............ 123/568.12 |
| 5,992,390 | A | | 11/1999 | Moyer | |
| 5,997,259 | A | | 12/1999 | Marshall et al. | |
| 6,295,817 | B1 | * | 10/2001 | Abthoff et al. | .................. 60/280 |
| 6,328,003 | B1 | | 12/2001 | Gaertner et al. | |
| 7,762,069 | B2 | * | 7/2010 | Gerum | ............................ 60/611 |
| 8,069,665 | B2 | * | 12/2011 | Pursifull et al. | ................ 60/611 |
| 8,281,587 | B2 | * | 10/2012 | Xin et al. | .......................... 60/611 |
| 8,371,276 | B2 | * | 2/2013 | Pursifull et al. | .............. 123/564 |
| 2007/0220886 | A1 | * | 9/2007 | Tschaler et al. | ............. 60/605.2 |
| 2007/0246008 | A1 | | 10/2007 | Gerum | |
| 2007/0256413 | A1 | * | 11/2007 | Marsal et al. | ................ 60/605.2 |
| 2009/0132153 | A1 | * | 5/2009 | Shutty et al. | ................... 701/108 |
| 2009/0158710 | A1 | * | 6/2009 | Suzuki | ........................... 60/285 |
| 2011/0041496 | A1 | * | 2/2011 | Mayr | ............................. 60/611 |

FOREIGN PATENT DOCUMENTS

| DE | 198 49 914 | C1 | | 11/1999 |
| DE | 10239110 | A1 | * | 3/2004 |

(Continued)

OTHER PUBLICATIONS

International Search Report dated Apr. 29, 2009 with English translation (six (6) pages).

*Primary Examiner* — Thai Ba Trieu
(74) *Attorney, Agent, or Firm* — Crowell & Moring LLP

(57) ABSTRACT

The invention relates to a method for supplying a compressor in an internal combustion engine with compressed air. The method has the following steps: determination of operating parameters of the internal combustion engine to identify operating states of the internal combustion engine; production of compressed air by the internal combustion engine using the determined operating parameter in an operating state without combustion and backing up of the compressed air using a throttle; and removal of the produced compressed air to supply the compressor. The invention also relates to a corresponding device.

6 Claims, 1 Drawing Sheet

(56) References Cited

FOREIGN PATENT DOCUMENTS

| DE | 10 2004 047 975 | A1 |   | 4/2006 |
|----|-----------------|----|---|--------|
| DE | 102007059145    | A1 | * | 6/2009 |
| DE | 102009026469    | A1 | * | 12/2010 |
| EP | 1956213         | A1 | * | 8/2008 |
| JP | 2012026298      | A  | * | 2/2012 |
| JP | 2012087740      | A  | * | 5/2012 |

* cited by examiner

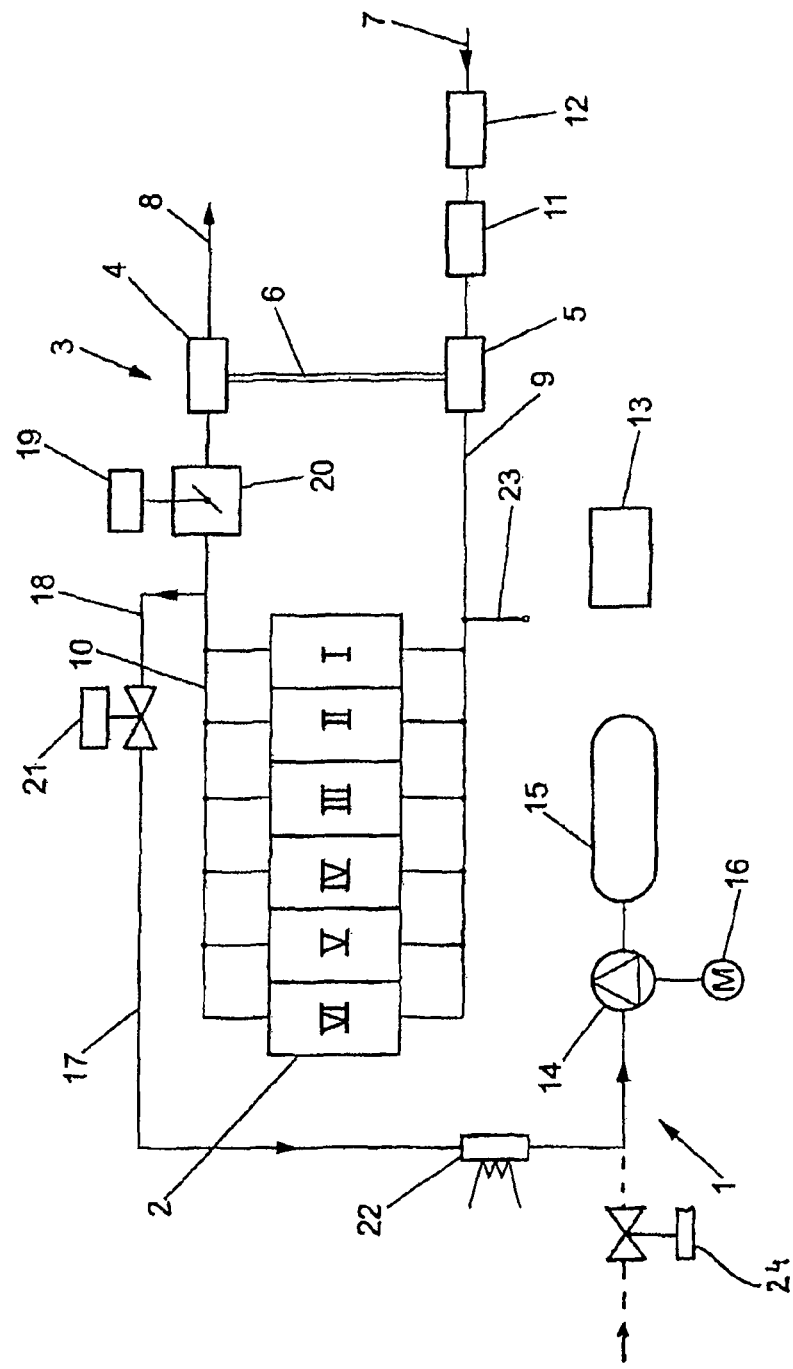

METHOD AND DEVICE FOR SUPPLYING A COMPRESSOR IN AN INTERNAL COMBUSTION ENGINE WITH COMPRESSED AIR

This application is a continuation of PCT International Application No. PCT/EP2009/000939, filed Feb. 11, 2009, which claims priority under 35 U.S.C. §119 to German Patent Application No. DE 10 2008 008 721.1, filed Feb. 12, 2008, the entire disclosures of which are herein expressly incorporated by reference.

BACKGROUND AND SUMMARY OF THE INVENTION

The invention relates to a method and a device for supplying a compressor with compressed air in an internal combustion engine.

Internal combustion engines of this type, for example piston engines, such as diesel engines, have a compressor for generating compressed air which is required for various purposes, for example for a compressed air brake system or an auxiliary air cell for various intended uses.

The applicant is aware of a compressor which is fed with air from the intake manifold of the internal combustion engine. Depending on the operating state and the rotational speed of the engine supercharged, for example, by a turbocharger, the pressure at the extraction point from the intake manifold is higher than the ambient air. The compressor consequently changes its operation from straightforward suction operation to supercharged operation, markedly increasing its efficiency and therefore the air quality conveyed. This arrangement has the disadvantage that the compressor extracts pressure-loaded air from the intake manifold and consequently withholds it from the internal combustion engine. That is to say, the power of the internal combustion engine in this operating state is reduced, in turn, by the discharged air, this being undesirable.

The object of the present invention, therefore, is to provide a method and a device for supplying a compressor with compressed air in an internal combustion engine, the above disadvantages being eliminated or significantly reduced, and further advantages being afforded.

A basic idea of the invention is that a point for the extraction of air for the compressor is arranged at a point on the internal combustion engine located at its exhaust manifold.

What is advantageously achieved thereby is that the intake air quantity for the internal combustion engine is not decimated, therefore its power is not restricted.

In modern internal combustion engines with an electronically controlled fuel supply operating in overrun, fuel is no longer supplied, in order thereby to reduce the energy consumption of the internal combustion engine in this operating state. It is used, in overrun, only for generating compressed air, that is to say the intake air is compressed in the cylinders and is blown out into the exhaust manifold and the exhaust line. This compressed exhaust air is built up and compressed by a throttle device, so that it has a markedly higher pressure level than the ambient air. This throttle device may be, for example, a conventional engine brake flap of an engine brake system already present, the said engine brake flap reducing or even shutting off the cross section of the exhaust line. The air thus highly compressed is then extracted via a controlled extraction valve from the exhaust manifold or the exhaust line and is supplied to the compressor which is thereby operated as a supercharged compressor with increased efficiency.

The internal combustion engine has an engine control apparatus for fuel supply which obtains operating parameters from sensors often already present in the vehicle. These data are in many cases also available on a vehicle bus system, for example a CAN bus. A control unit takes over these data in order to determine the operating states and can consequently control the extraction valve and the throttle device at the correct timepoint such that the compressed air generated by the cylinders in overrun and built up by the throttle device is supplied to the compressor. The valve may even be connected only in the case of one cylinder and/or in the case of all cylinders in order to acquire the possibility of a broad variation of compressed-air generation quantities.

With a comparable pressure level, the compressed air thus obtained is hotter than the compressed air which is extracted from the intake manifold, since it is likewise heated up by the engine which is heated during combustion. The efficiency of the compressor supercharged by the compressed air is therefore not as high as when the air comes from the intake manifold, although this air is also often preheated. When the internal combustion engine is in overrun, however, there is excess energy, and in this case the lowered efficiency of the compressor is negligible.

In a further version, the compressed air extracted from the exhaust line may be cooled by a heat exchanger.

Furthermore, the inlet of the compressor may be connected to the atmosphere via an inlet valve controllable by the control unit, so that, even when the internal combustion engine is in combustion mode, air can be compressed during normal operation.

Other objects, advantages and novel features of the present invention will become apparent from the following detailed description when considered in conjunction with the accompanying drawings.

BRIEF DESCRIPTION OF THE DRAWINGS

The FIGURE schematically illustrates an embodiment of the present invention.

DETAILED DESCRIPTION

The FIGURE shows a diagrammatic illustration of an internal combustion engine 2 with an exhaust gas turbocharger 3 and with a device 1 according to the invention for supplying a compressor 14 with compressed air.

In the example illustrated, the internal combustion engine 2 is a diesel engine with six cylinders I to VI, with an intake line 9 and with an exhaust line 10. An air inlet 7 is connected via an air filter 12 to an intake-air preheating means 11 which is connected to a compressor 5 of the exhaust gas turbocharger 3. This is followed by the intake line 9 to the cylinders I to VI. The compressor 5 of the exhaust gas turbocharger 3 is coupled to an exhaust gas turbine 4 of the exhaust gas turbocharger 3 via a coupling 6, for example a shaft. The exhaust gas turbine 4 is arranged in the exhaust line 10, upstream of an exhaust gas outlet 8 for exhaust gas from the internal combustion engine 2, and is driven by an exhaust gas flow.

A throttle device 20 is arranged in the exhaust line 10, upstream of the exhaust gas turbine 4, and is coupled to an actuating device 19. In this example, this throttle device 20 belongs to an engine brake system, not illustrated. However, the throttle device 20 may be arranged additionally. Upstream of the throttle device 20, an extraction pressure line 18 is connected to the exhaust line 10 and connects the latter to a controllable extraction valve 21. The extraction valve 21 is connected to an inlet of a compressor 14 via a pressure line 17 by means of a heat exchanger 22.

In this example, the compressor 14 is driven by an electric motor as a compressor drive 16. However, the compressor drive 16 may also be coupled to the crankshaft of the internal combustion engine 2. An outlet of the compressor 14 is connected to a compressed air reservoir 15 for storing the air compressed by the compressor 14.

An inlet valve 24 is shown here at the inlet of the compressor 14 and connects the inlet of the compressor 14 to the atmosphere in a controllable way.

A control unit 13 serves for controlling the extraction valve 21, the inlet valve 24 and the actuating device 19 of the throttle device 20. In this example, the control unit 13 is connected to an engine control apparatus, not shown, which controls the injection systems of the cylinders I to VI and which determines the operating states of the internal combustion engine 2 via sensors, not illustrated. The engine control apparatus controls the internal combustion engine in a known way and is not explained in any more detail.

The functioning of this device 1 is now described.

For example, from data values of the engine control apparatus or from a bus device, the control unit 13 determines, by comparison, the operating states of the internal combustion engine 2. If there is overrun, no fuel is conveyed into the cylinders I to VI which then only suck in air from the intake line 9 and compress it. In the expulsion stroke, the extraction valve 21 is opened by the control unit 13, and the generated compressed air from the internal combustion engine 2 is conducted to the compressor 14 via the pressure line 17. At the same time, the actuating device 19 of the throttle device 20 is controlled such that the throttle device 20 reduces or closes the cross section of the exhaust line 10, with the result that the compressed air generated by the cylinders I to VI is built up and is compressed to a higher extent. Furthermore, the inlet valve 24 is closed. In the other strokes of the internal combustion engine 2, the valve 21 remains closed. The compressed air reservoir 15 may be provided in a conventional way, not illustrated, with a non-return valve which prevents a situation where the compressed air stored in it may escape. A non-return valve may likewise be provided at the inlet valve 24 and prevents the situation where compressed air conveyed through the pressure line 17 may escape into the atmosphere via an open inlet valve 24. The heat exchanger 22 can optionally cool excessively hot compressed air from the exhaust line 10 to a desired value.

Shown here on the intake line 9 is a connection 23 to which the inlet of the compressor 14 is conventionally connected in the prior art and, as described above, extracts and therefore withholds the intake air required by the internal combustion engine.

The invention is not restricted to the exemplary embodiments described above. It can be modified within the scope of the accompanying claims.

For example, the compressor 14 may also stand for a compressed-air generation plant present in a commercial vehicle or for an additional plant.

The valves 21 and 24 may also be controllable pneumatically or electropneumatically.

The device 1 is also suitable for internal combustion engines 2 without a turbocharger 3.

The control unit 13 may be an integral part of an engine control apparatus.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SYMBOLS

1 Device
2 Internal combustion engine
3 Exhaust gas turbocharger
4 Exhaust gas turbine
5 Compressor
6 Coupling
7 Air inlet
8 Exhaust gas outlet
9 Intake line
10 Exhaust line
11 Intake-air preheating means
12 Air filter
13 Control unit
14 Compressor
15 Compressed-air reservoir
16 Compressor drive
17 Pressure line
18 Extraction-pressure line
19 Actuating device
20 Throttle device
21 Extraction valve
22 Heat exchanger
23 Connection
24 Inlet valve
I . . . VI Cylinders

What is claimed is:

1. A method for supplying a compressor with compressed air in an internal combustion engine, comprising the acts of:
    determining from at least one operating parameter of the internal combustion engine an operating state of the internal combustion engine;
    generating compressed air within the internal combustion engine when the determined operating state is a combustion-free operating state;
    operating a throttle device in an exhaust of the internal combustion engine to cause a build-up of the generated compressed air in the exhaust; and
    supplying the generated compressed air built up in the exhaust to the compressor,
    wherein
        the compressor is an air compressor connected to a compressed air reservoir for storing air compressed by the compressor,
        an inlet of the air compressor is arranged to be connected to the atmosphere via an inlet valve, and
        at least one controllable extraction valve is connected to the air compressor inlet via a heat exchanger configured to cool the compressed air from the at least one controllable extraction valve.

2. The method according to claim 1, wherein the compressed air is generated in at least one cylinder of the internal combustion engine which does not receive fuel in the combustion-free operating state.

3. The method according to claim 2, wherein during the build-up of compressed air in the combustion-free operating state of the internal combustion engine, a cross section of an exhaust line is reduced by the throttle device.

4. The method according to claim 1, wherein the generated compressed air is supplied to the compressor via at least one controlled extraction valve.

5. An apparatus for supplying a compressor with compressed air in an internal combustion engine, comprising:
- at least one controllable extraction valve arranged to control compressed airflow between an outlet of at least one cylinder of the internal combustion engine and the compressor when the internal combustion engine is in a combustion-free operating state;
- a controllable throttle device for varying a cross section of an exhaust line of the internal combustion engine to build up compressed air generated by the at least one cylinder; and
- a compressed air control unit, the control unit being configured to determine an operating state of the internal combustion engine from at least one detected operating parameter to control the at least one controllable extraction valve and the throttle device to control supply built up compressed air to the compressor,
- wherein
    - the compressor is an air compressor connected to a compressed air reservoir for storing air compressed by the compressor,
    - an inlet of the air compressor is arranged to be connected to the atmosphere via an inlet valve, and
    - the at least one controllable extraction valve is connected to the air compressor inlet via a heat exchanger configured to cool the compressed air from the at least one controllable extraction valve.

6. The apparatus according to claim 5, wherein the inlet valve is connected to the control unit for control of the inlet valve by the control unit.

* * * * *